US010098056B2

United States Patent
Gupta et al.

(10) Patent No.: US 10,098,056 B2
(45) Date of Patent: Oct. 9, 2018

(54) BROADCAST/MULTICAST BASED NETWORK DISCOVERY

(75) Inventors: Vivek Gupta, Portland, OR (US); Necati Canpolat, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 815 days.

(21) Appl. No.: 12/829,863

(22) Filed: Jul. 2, 2010

(65) Prior Publication Data

US 2010/0271978 A1 Oct. 28, 2010

Related U.S. Application Data

(63) Continuation of application No. 12/059,208, filed on Mar. 31, 2008.

(51) Int. Cl.
*H04W 48/16* (2009.01)
*H04W 48/14* (2009.01)
*H04W 8/00* (2009.01)
*H04W 84/12* (2009.01)
*H04W 88/08* (2009.01)

(52) U.S. Cl.
CPC .......... *H04W 48/14* (2013.01); *H04W 8/005* (2013.01); *H04W 48/16* (2013.01); *H04W 84/12* (2013.01); *H04W 88/08* (2013.01); *Y02D 70/142* (2018.01); *Y02D 70/146* (2018.01); *Y02D 70/23* (2018.01)

(58) Field of Classification Search
CPC .............................. H04W 48/14; H04W 84/02
USPC ............................................ 370/254, 331, 338
See application file for complete search history.

(56) References Cited

U.S. PATENT DOCUMENTS

| | | | |
|---|---|---|---|
| 7,535,884 B2 | 5/2009 | Stephenson et al. | |
| 7,558,388 B2 * | 7/2009 | Ptasinski | 380/270 |
| 7,830,833 B2 | 11/2010 | Walker et al. | |
| 8,078,196 B2 * | 12/2011 | Ruckart et al. | 455/456.3 |
| 8,238,889 B1 * | 8/2012 | Vu | 455/414.3 |
| 2006/0089144 A1 * | 4/2006 | Kim et al. | 455/439 |
| 2006/0140150 A1 * | 6/2006 | Olvera-Hernandez et al. | 370/331 |
| 2007/0054667 A1 * | 3/2007 | Lee et al. | 455/434 |
| 2009/0046682 A1 | 2/2009 | Kim et al. | |

FOREIGN PATENT DOCUMENTS

WO 2007089111 8/2007

OTHER PUBLICATIONS

Gupta, Vivek, "IEEE P802.21 Tutorial", IEEE 802.21 Session #15, San Diego, CA, Jul. 17, 2006, pp. 1-65.

* cited by examiner

*Primary Examiner* — Edan Orgad
*Assistant Examiner* — Nourali Mansoury

(57) ABSTRACT

Embodiments of the invention relate to apparatus, system, and method for use of WLAN access enabled mobile devices such as notebooks and handheld communication devices. In particular, embodiments of the invention relate to methodology whereby WiFi enabled devices can automatically select the appropriate service provider, in a power efficient manner, thereby taking advantage of different services offered by different service providers.

2 Claims, 3 Drawing Sheets

BROADCAST/MULTICAST BASED NETWORK DISCOVERY

RELATED APPLICATION

This application is a continuation of U.S. patent application Ser. No. 12/059,208, filed Mar. 31, 2008, and claims priority to that date for all applicable subject matter.

FIELD OF INVENTION

Embodiments of the invention relate to apparatus, system and method for use of WLAN access enabled mobile devices such as notebooks and handheld communication devices.

BACKGROUND

WiFi hotspots provide pubic WLAN access in many locations such as airports, hotels, coffee shops, etc. Multiple hotspot providers may provide overlapping service coverage in these areas. Roaming agreements may exist between different service providers. End users need to be aware of these roaming agreements and other available services to select the appropriate service provider and take advantage of different services offered.

The embodiments of the invention relate to methodology whereby WiFi enabled devices can automatically select the appropriate service provider, thereby taking advantage of different services offered by different service providers.

Related art for WLAN network/service discovery relies on manual user intervention to identify capabilities or services offered at any hotspot. In the absence of any advertisement mechanism, users will have to first associate with the hotspot, if they can, and determine the capabilities through manual exploration and manual entry, which is error prone and very difficult to do from small form factor devices (apart from battery drain and longer times to connect). Embodiments of the invention provide mechanisms for making the capability and service advertisement available during pre-association phase to WLAN hotspot which a mobile station ("STA") can use when discovering the service and selecting the network that offers the preferred capabilities.

DETAILED DESCRIPTION

Figure 1:
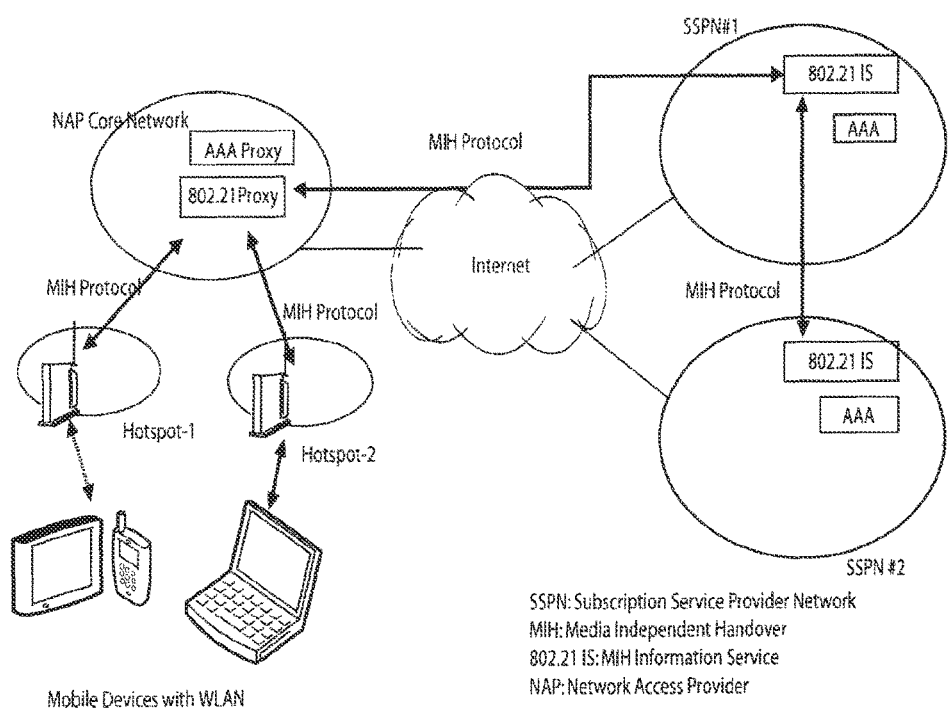
FIG. 1 shows an IEEE 802.11 based Reference Network.

In the following description, numerous specific details are set forth. However, embodiments of the invention may be practiced without these specific details. In other instances, well-known circuits, structures and techniques have not been shown in detail in order not to obscure the understanding of this description.

The following glossary defines terms used herein unless a different meaning is assigned within the context of usage. The Authoritative Dictionary of IEEE Standards Terms, Seventh Edition, should be referenced for terms not otherwise defined herein.

| Acronym | Definition |
|---|---|
| 3GPP | $3^{rd}$ generation Partnership Project |
| 3GPP2 | $3^{rd}$ generation Partnership Project 2 |
| AAA | Authentication, Authorization Accounting |
| AdvS | Advertising Server |
| AP | Access Points |
| AR IE | Access Request Information Element |
| BC | Broadcast |
| DoS | Denial of Service |
| B-SNA | Beacon-Start of Network Advertising |
| BWA | Broadband wireless access |
| DTI | Delivery Traffic Indication |
| DTIM | Delivery Traffic Indication Message |
| IEEE | Institute of Electrical and Electronic Engineers |
| IMS | IP Multimedia Subsystem |
| IPTV | Internet protocol television |
| L2 | Level 2 of the OSI networking model |
| LAN | Local area network |
| MAC | Medium Access Control |
| MC | Multicast |
| MCA | Multicast address |
| MIH | Media independent handover |
| NAI | Network Access Identifier |
| NA | Network Advertising |
| NAP | Network Access Provider |
| OFDM | Orthogonal frequency-division multiplexing |
| OFDMA | Orthogonal frequency-division multiple access |
| OSI | Open Systems Interconnection |
| OTA | Over The Air |
| PHY | Physical Layer |
| QoS | Quality of Service |
| SNA | Start of Network Advertising |
| SSID | Service set identifier |
| SSPN | Subscription Service Provider Network |
| STA | Station |
| TBTT | Target Beacon Transmission Time |
| TSF | Time synchronization function |
| TU | Time unit |
| WiMAX | World Interoperability for Microwave Access |
| WLAN | Wireless Local Area Network |

WiFi refers to wireless communication technology usable by both mobile and fixed communication devices. Mobile wireless technology may be specified in IEEE Standard 802.11, "Wireless LAN Medium Access Control (MAC) and Physical Layer (PHY) specifications" and amendments thereto (hereinafter "IEEE 802.11" or "802.11"). In particular, 802.11 Amendment 7, "Interworking with External Networks" may be referred to as "IEEE 802.11u" or "802.11u." Wireless technology used by fixed wireless communication devices may be specified in IEEE Standard 802.16, "Air Interface for Fixed Broadband Wireless Systems" and amendments thereto (hereinafter "IEEE 802.16" or "802.16"). It will be understood as used herein that "wireless," "wireless technology," and similar terms may refer to either 802.11 or 802.16 unless expressly limited otherwise.

The purpose of IEEE 802.11 is to provide wireless connectivity to automatic machinery, equipment, or stations that require rapid deployment, which may be portable or handheld, or which may be mounted on moving vehicles within a local area. This standard also offers regulatory bodies a means of standardizing access to one or more frequency bands for the purpose of local area communication. IEEE 802.11u specifies enhancements to 802.11 that support WLAN Interworking with External Networks, facilitating higher layer functionalities. IEEE 802.11u improves information transfer from external networks, aiding network selection, and enabling emergency services. IEEE 802.11 and amendments are hereby incorporated by reference in their entirety.

The purpose of IEEE 802.16 is to specify the air interface of fixed broadband wireless access (BWA) systems supporting multimedia services. The medium access control layer (MAC) supports a primarily point-to-multipoint architecture, with an optional mesh topology. The MAC is structured to support multiple physical layer (PHY) specifications, each suited to a particular operational environment. For operational frequencies from 10-66 GHz, the PHY is based on single-carrier modulation. For frequencies below 11 GHz, where propagation without a direct line of sight must be accommodated, three alternatives are provided: orthogonal frequency-division multiplexing (i.e., WirelessMAN-OFDM or "OFDM"); orthogonal frequency-division multiple access (i.e., WirelessMAN-OFDMA or "OFDMA"); and orthogonal frequency-division using single-carrier modulation (i.e., WirelessMAN-SCa or "single-carrier modulation"). IEEE 802.16 and amendments are hereby incorporated by reference in their entirety.

WiFi hotspots provide pubic WLAN access in many locations such as airports, hotels, coffee shops, etc. and may provide various services such as internet access, streaming video (e.g., IPTV), IMS, and online games. Multiple hotspot providers may provide overlapping service coverage in these areas. A roaming mobile device that is enabled for wireless communication may be within the coverage area of more than one network access point. The ability of a mobile device to choose from among the available network access points in the past has been limited. The mobile device may not be able to connect to the network at all required levels of the networking mode. (e.g., at L2, but not at the network layer). Another shortcoming is that if several networks are available to choose among, one network may be preferred but the mobile device may also connect to a different network based on signal strength criteria alone. This problem could extend to multiple interfaces as the number of interfaces on the mobile device increases.

A roaming mobile device that is enabled for wireless communication may enter and exit the coverage area of various network access points. The process of transitioning network access from one network access point to another is referred to as "handover." Handover may be a homogeneous ("horizontal") event within a single network, and used primary for localized or limited mobility, for instance multiple 802.11 access points within a single LAN. Handover may also be a heterogeneous ("vertical") event in which the handover occurs across different types of networks, and is used primarily for more global mobility. Vertical handover offers more opportunities for optimizing the handover process.

Standardized handover protocols have been proposed in draft IEEE Standard 802.21, "Media Independent Handover Services" and amendments thereto (hereinafter "IEEE 802.21" or "802.21"). IEEE 802.21 and amendments are hereby incorporated by reference in their entirety. IEEE 802.21 defines a common media independent handover (MIH) function between Layer 2 and Layer 3 of the Open Systems Interconnection ("OSI") network stack, which enables mobility across heterogeneous networks. By allowing client devices and networks to work cooperatively during these network transitions, IEEE 802.21 provides mechanisms for optimizing handovers across Wi-Fi, WiMAX and cellular radios that will dramatically enhance the user's mobile experience. The intended application of IEEE 802.21 is primarily for vertical handovers, but it can also be used for homogeneous handovers. IEEE 802.21 enables co-operative handover decision making between clients and network. Media specific changes closely follow the base 802.21 media independent handover ("MIH") protocol.

IEEE 802.21 can provide a way for end users to select the most appropriate provider, and this selection may change with time, location, or type of service. Benefits of 802.21 include optimum network selection, seamless roaming to maintain connections, and lower power operation for multi-radio devices.

Supporting concurrent multiple radios presents unique mobility-related and platform-related challenges. Client devices must be capable of automatically detecting and selecting the best wireless network and providing a seamless transition from one network to another. Emerging mobility standards are needed to enable handovers and also to enable terminal mobility across multiple points of attachment as changes in user environments make one network more attractive than another.

The standards address two kinds of handover: homogeneous handovers and heterogeneous handovers. Homogeneous handovers across similar points of attachment such as Wi-Fi Access Points ("APs"), and WiMAX base stations within a single network, are handled by the technology standards of the respective access networks. IEEE 802.11k and 802.11r address mobility in WLAN networks. IEEE 802.16e augments mobility in WiMAX (802.16), and mobility in cellular networks is enabled by 3GPP and 3GPP2 standards. Heterogeneous handovers are defined as handovers across different networks and are applicable to multiradio client platforms. The emerging IEEE 802.21 standard addresses mobility across heterogeneous networks.

The embodiments of the present invention include a method for wireless discovery of network services by one or more wireless clients. The method includes transmitting a probe request from a first networking client to a network access point, wherein the first networking client has a wireless communication capability; then receiving a probe response, from the network access point, by the first networking client, wherein the probe response includes an indication of network services available to the first networking client.

Optionally, this method by the wireless networking client may further include calculating service availability from the probe response.

Optionally, this method by the wireless networking client may further include ranking service provider preference based on the probe response.

Optionally, this method by the wireless networking client may further include using a beacon to formulate the probe request.

Optionally, this method by the wireless networking client may further include using the probe response to formulate a second probe request.

Optionally, this method by the wireless networking client may be characterized by probe request being created using specific device configuration information of the wireless networking client.

Optionally, this method by the wireless networking client may further include operating using a wireless network protocol selected from the group consisting of IEEE 802.11, IEEE 802.16 and WiMAX.

Embodiments of the present invention also include a method for wireless discovery of network services by a first wireless client. The method includes receiving a probe response from the network access point, by the first wireless networking client, in which the probe response had been transmitted in broadcast mode in response to a probe request from a second wireless networking client; furthermore, the probe response includes an indication of network services available to the second wireless networking client. The first wireless networking client then uses data from the probe response to configure communication access by the first wireless networking client.

Optionally, this method by the first wireless networking client may further include calculating service availability from the probe response, and ranking service provider preference based on the probe response.

Embodiments of the present invention also include an apparatus to perform wireless discovery of network services. The apparatus includes a processor configured to create a probe request; a wireless transmitter in communication contact with the processor, with the wireless transmitter configured to transmit the probe request; a wireless receiver in communication contact with the processor, with the wireless receiver configured to receive a probe response. The probe response includes an indication of wireless network services available to the apparatus.

Optionally, this apparatus to perform wireless discovery of network services may operate with the IEEE 802.11, IEEE 802.16 or WiMAX communications protocol.

Embodiments of the present invention also include a system for wireless discovery of network services, including a network access point, having a first processor, configured to receive a probe request from a first networking client, in which the first processor creates a primary advertisement query from the probe request. The system also includes a Network Advertising Provider Advertising Server ("NAP AdvS"), in communication contact with the network access point, configured to receive the primary advertisement query from the network access point. The system also includes a second processor, within the NAP AdvS, in which the second processor is configured to determine a primary advertisement response, wherein the primary advertisement response is communicated from the NAP AdvS to the network access point. The first processor creates a query response for transmission to the first networking client, using information from the primary advertisement response.

Optionally, this system for wireless discovery of network services may include a Subscription Service Provider Network advertising server ("SSPN AdvS") in communication contact with the NAP AdvS. The NAP AdvS is configured to transmit a secondary advertisement query to the SSPN AdvS. A third processor is located within the SSPN AdvS, wherein the third processor is configured to determine a secondary advertisement response, wherein the secondary advertisement response is communicated from the SSPN AdvS to the NAP AdvS. The second processor then creates the primary advertisement response for transmission to the network access point, using information from the secondary advertisement response.

Optionally, this system for wireless discovery of network services further includes a plurality of wireless networking clients, in which at least one of the plurality of wireless networking clients does not transmit a probe request, but can receive and act upon a probe response.

Embodiments of the present invention also include a method for wireless discovery of network services, by a server of wireless networking, including receiving a probe request from a first networking client, by a network access point; creating a primary advertisement query from the probe request by the network access point; transmitting the primary advertisement query from the network access point to a NAP AdvS in communication contact with the network access point; creating a primary advertisement response by the NAP AdvS; transmitting the primary advertisement response from the NAP AdvS to the network access point; and using information from the primary advertisement response to create a composite query response for transmission to the first networking client.

Optionally, the method for wireless discovery of network services, by a server of wireless networking, may further include transmitting a secondary advertisement query from the NAP AdvS to the SSPN AdvS; determining a secondary advertisement response, by the SSPN AdvS, using the secondary advertisement query; transmitting the secondary advertisement response from the SSPN AdvS to the NAP AdvS; and using information from the secondary advertisement response to create the primary advertisement response for transmission to the network access point.

Optionally, the method for wireless discovery of network services, by a server of wireless networking, may be further characterized by the query response being transmitted in broadcast mode, suitable for reception by a networking client different than the first networking client.

Optionally, the method for wireless discovery of network services, by a server of wireless networking, may be further characterized by the secondary advertisement response being formed by analyzing system capability by the SSPN AdvS.

Optionally, the method for wireless discovery of network services, by a server of wireless networking, may be further characterized by the composite query response being queued in the network access point.

Optionally, the method for wireless discovery of network services, by a server of wireless networking, further includes transmitting the composite query response such that it includes forming a plurality of sections of the composite query response; transmitting a plurality of messages, wherein each message includes at least one section of the composite query response.

Optionally, the method for wireless discovery of network services, by a server of wireless networking, is further characterized by the composite query response being transmitted as at least one multicast message.

FIG. 1 provides exemplary reference configurations of an 802.11 reference network. Hot spots 1 and 2 could be using a common Network Access Provider ("NAP") that provides a broadcast of the communication capability of the hot spot and a broadcast or advertisement of the services offered and AAA services. The hotspots may also obtain these advertised services from different Subscription Service Provider Network ("SSPN") providers through the NAP core network. The advertisement information may include SSPN name, service set identifier ("SSID"), inter-working services, enrollment information, etc. The NAP AAA server authenticates customers of the NAP onto their network. The NAP AAA also acts as a proxy server to relay client authentication information requests to the SSPN AAA servers, and routes the authentication requests based on Network Access Identifier (NAI).

For seamless handovers between different networks and for optimum selection of different networks, clients need to be able to find back-end networks with favorable roaming agreements. Clients need to be able to receive the advertised capabilities from SSPNs and roaming partners, and be able to request more information about available services, so that clients can make use of the information during its network selection. This process is referred to as the service discovery process.

There are at least three issues in the service discovery process. First, clients may request information based on their specific device configuration, and the requests may require the clients to use multiple protocols to query the information. Second, multiple clients may query for the same information and hence information needs to be provided in a manner that provides an efficient usage of power and bandwidth, while minimizing adverse impact to other clients. Third, because a client may not know in advance which networks the client can connect to, the client may query this information when not associated with a particular public WLAN. The client will scan and retrieve information from multiple networks, which can lead to large power consumption depending on the number of available networks, thereby draining battery power. Therefore clients need to retrieve this information in a power efficient manner.

Figure 2:
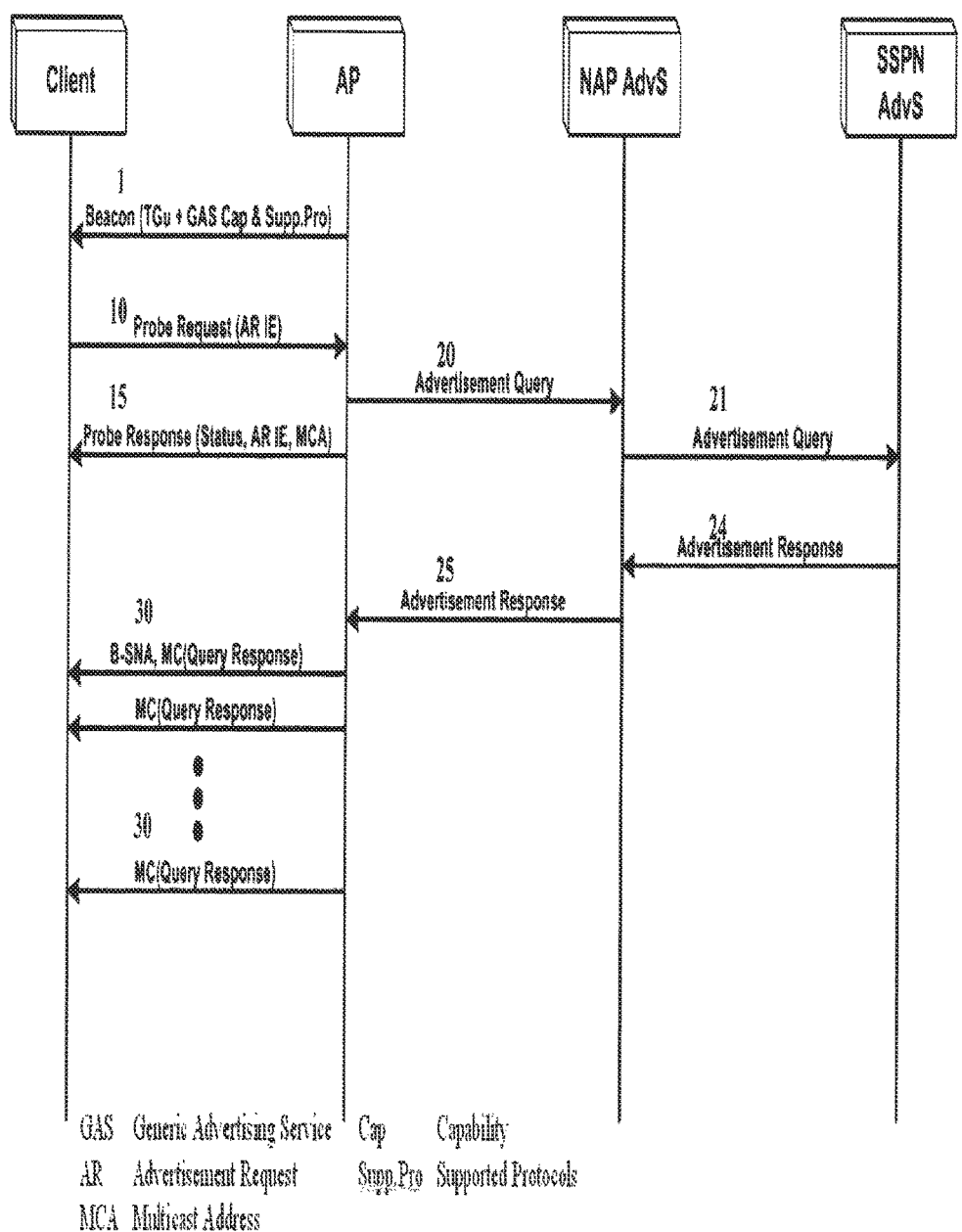
FIG. 2 shows an example flow of advertisement mechanism.

FIG. 2 presents an embodiment of the present invention providing a method that has improved service discovery. Prior to performing the method, the AP may periodically transmit a beacon 1 ("advertising beacon 1") that advertises capabilities of the AP, such as the advertising protocol that the AP supports.

Prior to performing the method, the client has completed network entry and an initial attach procedure. The client is able to send and receive frames from the AP, but the client has not been authenticated with the network and hence the client cannot access network services. The method of FIG. 2 is performed by: First, the client makes a probe request 10 which includes a query of services available through the AP. The probe request 10 is made using a protocol determined by the client after monitoring the advertising beacon 1 from the AP. The probe request 10 includes a request identifier Access Request Information Element ("AR IE"), which uniquely identifies the probe request 10. The AP may use the probe request 10 to formulate an advertisement query 20 to request advertisement information from an advertising server. The probe request 10 is more fully described in IEEE 802.11u.

When the AP receives a probe request 10 from a client, the AP confirms receipt of request by returning to the client a probe response 15, which includes the pass/fail status of the request; the AR IE request identifier; and the multicast address ("MCA") to which the response is sent. Including the AR IE in the response from the AP allows the client to match a response from the AP with a request sent by the client by matching the AR IE returned by the AP with the AR IE sent by the client.

In some cases the AP can prepare a probe response 15, responding to the probe request 10, based on information cached within the AP. In other cases, the AP may have to query the NAP server and get a response from the NAP server to respond to the probe request 10. The Access Point ("AP") will form an advertisement query 20 to relay the probe request 10 to a NAP Advertising Server ("AdvS"). If the NAP AdvS is not able to satisfy the query, the NAP AdvS will relay the advertisement query 20 to an SSPN AdvS using a secondary advertisement query message 21 shown in FIG. 2. The connection between the AP AdvS and the NAP AdvS may be implemented at either L3 (i.e., the IP layer of communication), or at L2 (i.e., the data link layer of communication), therefore the advertisement query 20 can be transmitted at either L3 using an IP frame, or L2.

The NAP and SSPN Advertising Servers store information about the capabilities of network and the services they provide, and can help the client determine whether or not it is possible or feasible to connect to these NAP and SSPN Advertising Servers. For instance, if the client needs VoIP/IPTV or gaming services and if the network does not provide these services, then it would not be feasible for the client to connect to the network. The procedure begins by having the client request what services are provided by the network. The NAP and SSPN AdvS analyze system capability and respond back appropriately with the services provided by the network. In some cases a NAP may have all the information, whereas in other cases the NAP may have to redirect the requests to specific operators that may maintain their own SSPN AdvS and generate the appropriate response based on the query from the client.

Any response to the advertisement query (i.e., an advertisement response) from the NAP AdvS or SSPN AdvS is sent to the AP via one or more Advertising Response 25 messages. The AP then transmits back to the client a plurality of multicast Action Frames in response to the probe request 10 from the client, containing an encapsulated query response 30 (i.e. "MC(Query Response)"), wherein a multicast frame is a frame that is addressed to a plurality of recipients. The first MC(Query Response) message is included with the B-SNA beacon. The query response 30 includes action frames transmitted in clear text, wherein in a further embodiment the reliability of the transmission is improved by, for example, transmitting each advertising frame several times. If any additional advertisement responses 25 have been received from the NAP AdvS, or secondary advertisement responses 24 from the SSPN AdvS, those responses are passed to the client using additional MC(Query Response) messages 30. Details of the structure of these messages are provided in IEEE 802.11u.

Action Frames that follow the beacon are used to relay the Query Response 30, the Action Frame being a message format defined by 802.11 that provides a mechanism for specifying management actions. An embodiment of the invention includes that the Query Response 30 may be divided into portions called "chunks," and then be transmitted to the client in chunks having a size determined by the AP based on the size of the response message and based on how much time it would take to send a chunk based on network speed. The chunks are sent at regular intervals as part of every "Nth" periodic beacon messages, wherein "N" is denoted by the DTIM interval.

Although a single client may have transmitted the probe request 10, multiple clients may be interested in the response. This situation may arise when there is a surge of clients attempting to access services on a network, for instance in an airport lounge when passengers exit an arriving airplane. In such situations, the clients will all need the same type of information, and network efficiency would be improved if all clients could receive the Query Response 30, sent as a multicast in response to the first Probe Request 10. Embodiments of the present invention make the response from the AP available to multiple clients, including silent clients, by using broadcast and/or multicast messages to transmit the advertising response from the AP. These silent clients ignore the AR IE field. Embodiments of the present invention provide improved use of radio frequency (RF) spectrum and the bandwidth. System throughput is improved because the silent clients avoid the need to transmit a Probe Request 10, resulting in less message traffic contending for bandwidth over the air, and removing from the AP the burden of responding to duplicative Probe Requests 10. The silent clients are able to monitor the availability of services, and are able to improve their connections at a later time with any changes in available services, link conditions, or the silent client's service requirements.

By having the AP send the query response 30 in a broadcast/multicast manner, the silent clients can determine network capability without having to transmit an advertisement query 10, thereby conserving power in the client, reducing usage of transmission bandwidth, and increasing MAC efficiency. Because the information is sent in small chunks, the beacon message containing this information is relatively short, thereby reducing the disruption to other routine network operations.

Figure 3:
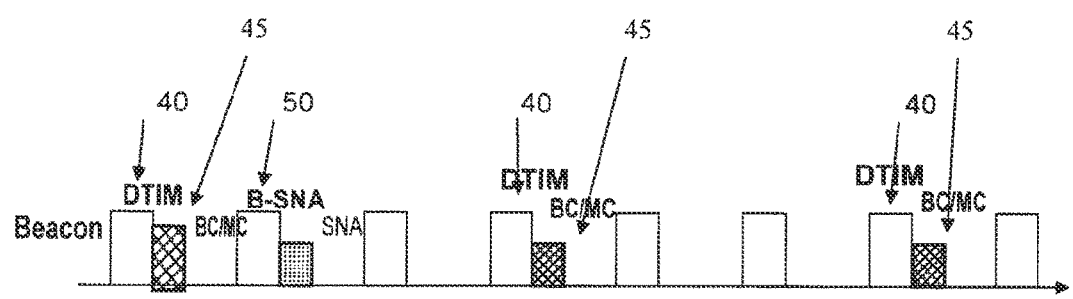
FIG. 3 shows multicasting service discovery information in chunks at regular intervals.

FIG. 3 presents an example of a sequence of beacon transmissions, with a DTIM interval of 3, wherein the DTIM interval indicates the proportion of the total number of beacons to the number of beacons containing the DTIM information chunks 45. For instance, a DTIM interval of "3" indicates that every third beacon contains an information chunk 45. Each of the beacon transmissions having a DTIM information chunk 45 is referred to as a "DTIM beacon 40." Because beacon messages are transmitted at fixed times known in advance, the DTIM beacons 40 can be spaced out, thereby reducing the distortion in the duration and relative timing of each beacon. Information chunks 45 are transmitted in broadcast and multicast format, commencing immediately after the DTIM beacon 40. B-SNA 50 is the Beacon-Start of Network Advertising.

Beacons are sent at regular intervals and are usually of a fixed number of bits, as shown in FIG. 3 by the hollow bars, bearing various fields of information that may be received by any client, or any mobile terminal attempting to become a client. DTIM beacons 40 are a subset of normal beacons, wherein DTIM beacons 40 occur periodically after a predetermined number of normal beacons have elapsed. DTIM beacons 40 contain a special flag denoting that beacon as the start of a DTIM frame. After each DTIM beacon 40, additional information is sent in additional chunks 45 as indicated by the shaded bars. FIG. 3 illustrates the DTIM 40 beacon and additional chunk 45 transmitted in place of every third normal beacon. One field within a DTIM beacon 40 is the DTIM interval. Clients, knowing which beacons are DTIM beacons 40 from monitoring the flag, can extract the DTIM interval from the DTIM beacon 40.

B-SNA 50 is an otherwise normal, non-DTIM beacon that signals the Start of Network Advertising. The B-SNA interval is "N" times the DTIM interval with offset of +1, wherein the offset refers to the location of the query response 30 with respect to the next B-SNA beacon 50; "N" is configurable and an offset of +1 helps ensure that the B-SNA beacon 50 does not collide with the DTIM beacon 40. Typical values of N produces B-SNA every 1-2 seconds.

Immediately after a B-SNA beacon 50 is sent, a Network Advertising (NA) frame begins. NA frames are transmitted as clear text (i.e., not encrypted), in multicast action frames. However, unlike a BC/MC information chunk 45, in which a chunk 45 of the Query Response 30 is broadcast/multicast after a DTIM beacon 40, NA frames can have other intervening in time unicast frames (i.e., a frame intended for only one host), for instance QoS frames. Since information is sent in small chunks that are spread out over time, the change to the starting time of the next B-SNA beacon 50 is minimized, producing a small shift in time, thereby minimizing the jitter of the beacon. The B-SNA beacon 50 contains the B-SNA count and the data buffered bit so that the client can predict the TSF time when network advertisements will start and whether any advertisements will be sent after the B-SNA beacon 50.

B-SNA also includes a configured "Time to Suspend" field, which is the amount of time in TUs that an AP will schedule NA frames for transmission after the Target Beacon Transmission Time ("TBTT") for B-SNA. After expiration of this time, no more NA frames will be transmitted until the next B-SNA beacon 50.

If additional advertising frames are queued in the AP, then a "MORE" data bit in the multicast action frame is set to indicate that additional advertising frames are queued.

Embodiments of the present invention offer solutions providing much better system operation and improved user experiences. Other key advantages include: Susceptibility to a Denial of Service ("DoS") attack is minimized because the network manages bandwidth consumption over the air; More efficient utilization of bandwidth and spectrum by multicasting the responses based on specific user query, and by the AP limiting probe requests 10 if needed; Network efficiency is improved because an un-associated client never gets its frames passed into network; and less power is required by clients, because clients wake up only at predetermined points in time.

This application may disclose several numerical range limitations that support any range within the disclosed numerical ranges even though a precise range limitation is not stated verbatim in the specification because the embodiments of the invention could be practiced throughout the disclosed numerical ranges. Finally, the entire disclosure of the patents and publications referred in this application, if any, are hereby incorporated herein in entirety by reference.

What is claimed is:

1. A method for wireless communications, the method comprising:
   wirelessly receiving, at a Network Advertising Provide Advertising Server (NAP AdvS), a first transmission from an access point, the first transmission having a primary advertising query;
   based on a determination that the NAP AdvS is not able to satisfy the primary advertising query:
      wirelessly transmitting a second transmission to a subscription service provider, the second transmission having a secondary advertising query; and
      wirelessly receiving a third transmission from the subscription service provider, the third transmission having a secondary advertising response; and
   wirelessly transmitting a fourth transmission to the access point, the fourth transmission having a primary advertising response;
   wherein the primary and secondary advertising queries each contain a request for information indicating advertised capabilities and services available from other networks;
   wherein the primary and secondary advertising responses each contain information indicating the advertised capabilities and services available from the other networks.

2. A wireless communications device, the device configured for:
   wirelessly receiving, at a Network Advertising Provide Advertising Server (NAP AdvS), a first transmission from an access point, the first transmission having a primary advertising query;
   based on a determination that the NAP AdvS is not able to satisfy the primary advertising query:
      wirelessly transmitting a second transmission to a subscription service provider, the second transmission having a secondary advertising query; and
      wirelessly receiving a third transmission from the subscription service provider, the third transmission having a secondary advertising response; and
   wirelessly transmitting a fourth transmission to the access point, the fourth transmission having a primary advertising response;
   wherein the primary and secondary advertising queries each contain a request for information indicating advertised capabilities and services available from other networks;

wherein the primary and secondary advertising responses each contain information indicating the advertised capabilities and services available from the other networks.

* * * * *